May 23, 1950     G. W. BARNES, JR., ET AL     2,508,592
RECORDING INSTRUMENT

Filed Oct. 6, 1945     4 Sheets-Sheet 3

INVENTOR.
GEORGE W. BARNES JR.
JOHN F. GOETZ
BY WALTER P. WILLS

ATTORNEY

May 23, 1950

G. W. BARNES, JR., ET AL 2,508,592

RECORDING INSTRUMENT

Filed Oct. 6, 1945

INVENTOR.
GEORGE W. BARNES JR.
JOHN F. GOETZ
WALTER P. WILLS
BY
E. Wellford Mason
ATTORNEY.

Patented May 23, 1950

2,508,592

UNITED STATES PATENT OFFICE 2,508,592

RECORDING INSTRUMENT

George W. Barnes, Jr., Clifton Heights, and John F. Goetz and Walter P. Wills, Philadelphia County, Pa., assignors, by mesne assignments, to Minneapolis-Honeywell Regulator Company, Mineapolis, Minn., a corporation of Delaware Application October 6, 1945, Serial No. 620,827

14 Claims. (Cl. 178—19)

The present invention relates to recording instruments or systems and in particular to instruments of the telautographic type in which a message to be dispatched is written in one location and is received in duplicate at a remote location. The present application is directed more specifically to the general combination of the apparatus and to the details of the transmitting mechanism. A copending application of G. W. Barnes, R. M. Johnson and W. P. Wills, Ser. No. 620,828, filed October 6, 1945, is particularly directed to the details of the receiving mechanism. Attention is also called to the application of R. F. Wild, Ser. No. 620,832, filed October 6, 1945, in which there is disclosed an electrical transmitting system by means of which the movements of a writing implement in the transmitting instrument may be used to energize motors which drive a recording pen in the receiving instrument.

The transmitting instrument of the present invention includes a writing implement that is attached to the lower end of a telescoping arm. The upper end of this arm is mounted on a gimbal arrangement that in turn is mounted above the center of the writing table so that the writing implement may be moved freely in all directions to make any type of marks desired. Movement of the implement supporting arm is transmitted through the rings of the gimbal to an electrical transmitting apparatus. Provision is made to compensate for the movement of the writing implement away from the center of the writing table and toward the edge thereof so that the receiving instrument may have true rectilinear coordinates.

It is an object of the present invention to provide a novel telautographic apparatus in which a receiving pen is moved across a chart in exact correspondence with the movement of a transmitting writing implement across a writing surface. It is a further object of the invention to provide a novel writing implement supporting mechanism on the transmitting apparatus of a system of the type mentioned so that the implement may be moved to different distances from its support as it is moved across its writing table. It is a further object of the invention to provide a telescoping supporting arm for a transmitting writing implement.

It is also an object of the invention to provide a gimbal arrangement by means of which a writing implement and its supporting arm may be supported for movement in any direction over a writing table. By having the implement supported from a point over the writing table rather than by an arm which extends inwardly from an edge thereof, the table is at all times clear of any obstructions. It is a further object of the invention to provide a novel drive between the rings of the gimbal and the electrical transmitting apparatus so that movement of the implement different distances from its point of support in a given direction will be translated into linear movement of the transmitting apparatus. This permits the use of rectilinear coordinates on the receiving apparatus even though the transmitting implement is being moved around a center.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
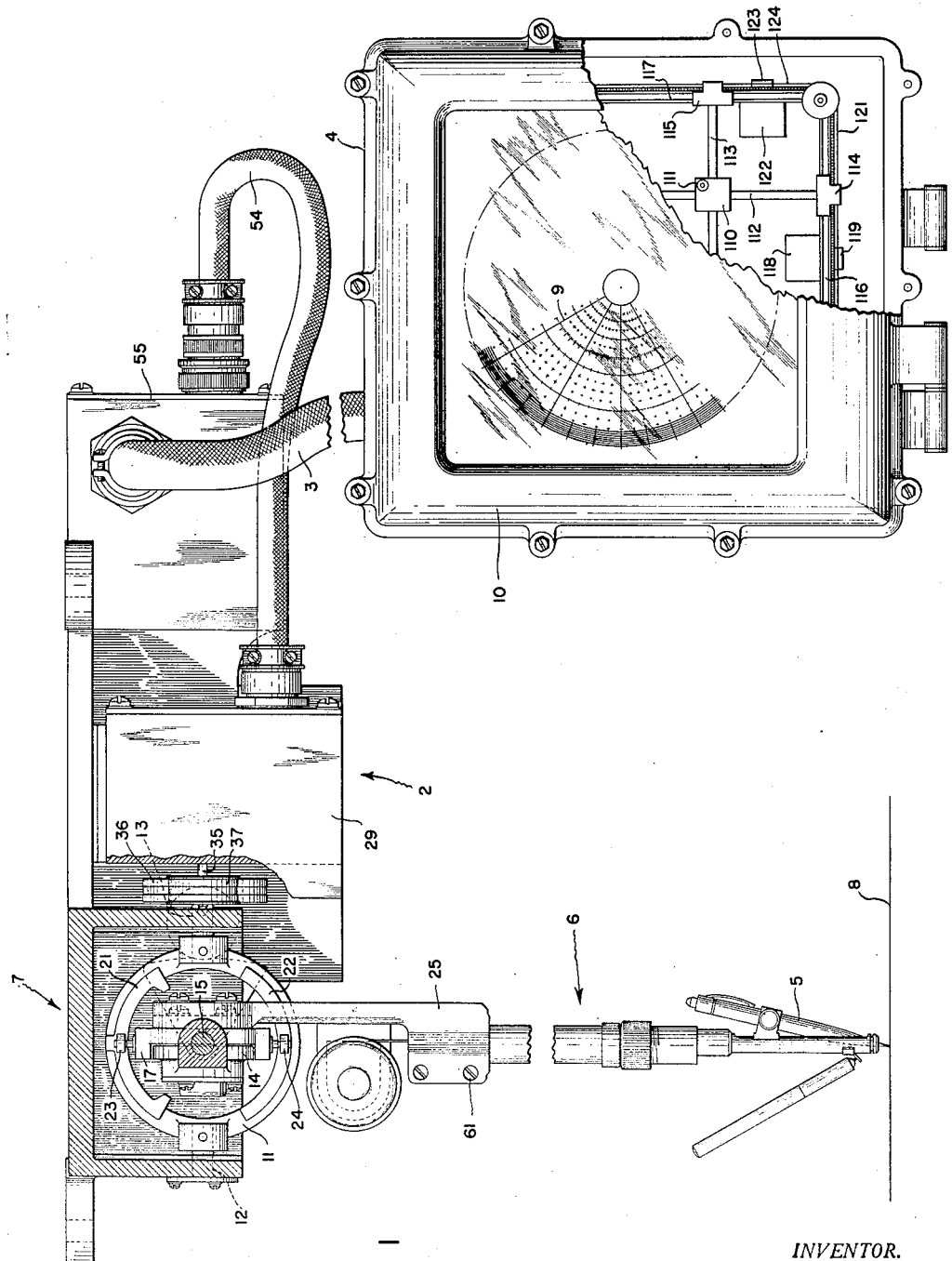
Figure 1 is a general view of the transmitter and of the receiving instrument.

Referring first to Figure 1 there is shown a transmitting unit 2 which is connected by a suitable cable 3 of any length with a receiving unit 4. The transmitting unit is provided with a writing implement 5 that may be either a pen or pencil and is supported by an arm 6 from a gimbal arrangement 7, the parts of which are moved as the arm 6 is moved in any direction across a table or other writing surface 8. Movement of the arm 6 serves to operate a capacitance type electrical transmitting system of the type described in detail in the above mentioned Wild application, which movements are transmitted to a suitable recording pen that is located in the receiving unit 4, the details of which are described in the above mentioned Barnes et al. application. In the receiving unit there is provided a pen that is carried for movement. The chart is illuminated from below so that a mark made on the chart may be seen from above through a window that is provided in the top 10 of the receiving unit. This window is shown as having on it a suitable scale 9 whereby the marks made on the chart may be oriented with respect to each other. The use of this scale however, is not necessary since ordinary writing or printing may be transmitted in addition to various geometrical figures.

In Figure 1 a portion of a receiving instrument is broken away to show a pen carriage 110 which has a pen 111 mounted thereon. This carriage is carried for movement in two directions respectively, by bars 112 and 113. The supporting bars for the carriage have rollers 114 and 115 respectively on their ends which ride on tracks 116 and 117 that are provided in the base of the receiving instrument. As the rods 112 and 113 are moved, it will be seen that the pen carriage 110 will be moved in any direction beneath the chart. If rod 112 only is moved, the carriage will be moved in one direction only. But if rods 112 and 113 are simultaneously moved, the pen carriage 110 will be moved at an angle to both sides of the instrument. Movement is imparted to the rod 112 by means of a motor 118 which has a drive pulley 119 attached to it. This pulley drives a cable 121 that passes over suitable guide pulleys at opposite ends of the track 116 and which is fastened to the roller 114. In a like manner there is provided a motor 122 which has a drive pulley 123 fastened to its shaft. As the pulley 123 is rotated, it drives a cable 124 that passes around suitable guide pulleys at the ends of tracks 117 and which is attached to the roller 115. The motors are energized for rotation through the electrical transmission system that is described in detail in the above mentioned application in response to movement of the writing implement 5.

The transmitting unit 2 is intended to be mounted on the under side of a support located directly above the writing surface. Thus the writing implement 5 has its tip placed over the center of the writing surface formed on the table 8. Therefore, movement of this writing implement in any direction across the table operates through the gimbal arrangement to suitably move the components of the electrical transmission system.

The gimbal arrangement is composed of three main parts; first, a large ring 11 that is provided with suitable stud shafts 12 and 13 pivoted in bearings provided for this purpose in the frame of the transmitter; second, a small ring 14 that is provided with suitable stud shafts 15 and 16 pivoted in the frame at right angles to and in the same horizontal plane as the shafts 12 and 13, and third, a plate or supporting member 17 that is provided with a stud shaft 18 which is pivoted in a suitable bearing 19 that is mounted in the center of small ring 14. The shaft 18 is in the vertical position of ring 14 coaxial with the shafts 12 and 13 that support the large ring of the gimbal. The large ring is provided with a curved track 21 on one face thereof which is above the pivots and with a curved track 22 on the same face of the ring that is located below the pivots 12 and 13. These tracks are engaged respectively by rollers 23 and 24 that are fastened to diametrically opposed points of the plate 17 so that as the plate is moved, the rollers are moved along the tracks. Movement is imparted to the various parts of the gimbal mechanism as the arm 6 is moved by means of an arm supporting member 25 that is attached by screws 26 to the face of the plate 17 opposite that from which shaft 18 projects.

When the arm 6 is being moved in a straight line either parallel to shafts 12 and 13 or parallel to shafts 15 and 16, it is necessary that only ring 14 or ring 11, respectively, be moved. This is true since when the writing implement is being moved in such a line, only one of the motors 118 or 122 should be energized for rotation.

Figure 3:
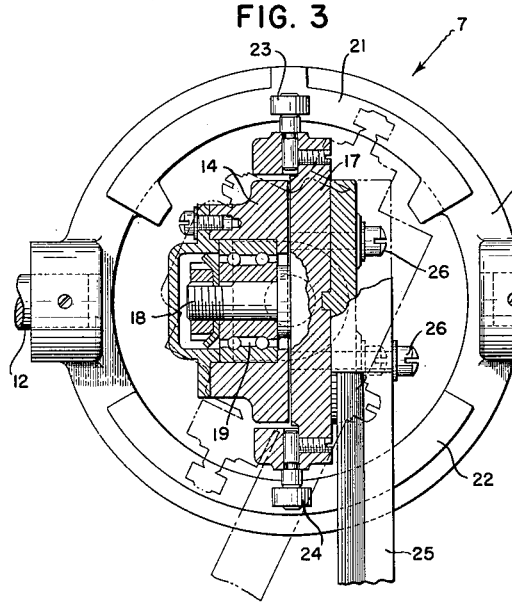
Figure 3 is a view taken on line 3—3 of Figure 2.

Referring to Figure 3, it will be seen that no matter whether the ring 14 is vertical in its full line position or is tilted to some position out of the vertical such as is shown in dotted lines, if the ring 14 is held still, and the arm 25 moved around shaft 18, the arm will move in a straight line. As this movement occurs, rollers 23 and 24 on plate 17 will tilt ring 11 around its axis on shafts 12 and 13. If arm 25 is in its full line position, there will be no movement of rollers 23 and 24 around their axes. If the arm 25 is in its dotted line position, there will be a slight oscillatory movement of the rollers along tracks 21 and 22 due to the fact that shaft 18 is not at that time coaxial with shafts 12 and 13.

Figure 4:
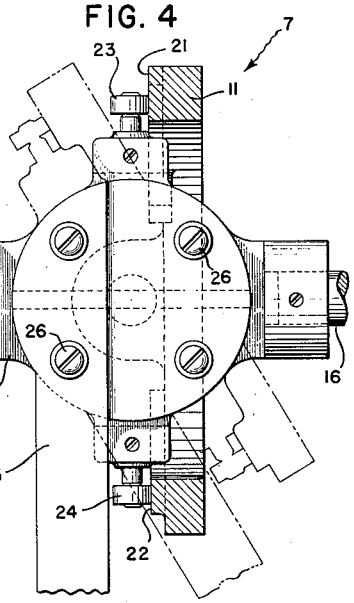
Figure 4 is a view taken on line 4—4 of Figure 2.
Figure 5:
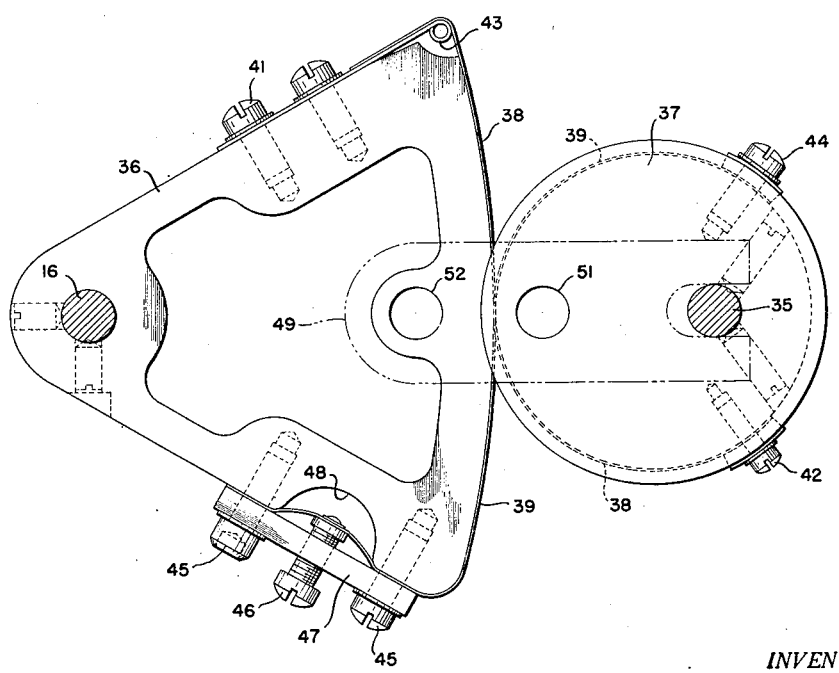
Figure 5 is a view taken on line 5—5 of Figure 2.

Reference is now made specifically to Figure 4. If the ring 11 is held in its full line position and arm 25 is moved, ring 14 will be rotated by shaft 18 around the shafts 15 and 16. The rollers 23 and 24 will move along tracks 21 and 22, respectively, to guide the arm 25 in a straight line. In a like manner the arm 25 will be guided in a straight line by ring 11 when the latter is tilted to any angle to the vertical as shown, for example, in its dotted line position in Figure 4. When ring 11 is tilted and arm 25 is moved, there will be a slight oscillation of plate 17 around its axis relative to ring 14 due to the fact that arm 25 is no longer perpendicular to shafts 15 and 16.

If the arm 6 is moved in any direction other than parallel to or perpendicular to the paper in Figures 1, 3, and 4, the plate 17 will simultaneously move both of the gimbal rings 11 and 14 in the manner above described. This will produce simultaneous energization of motors 118 and 122 in the receiver to move pen 111 diagonally across the chart of that instrument.

Figure 2:
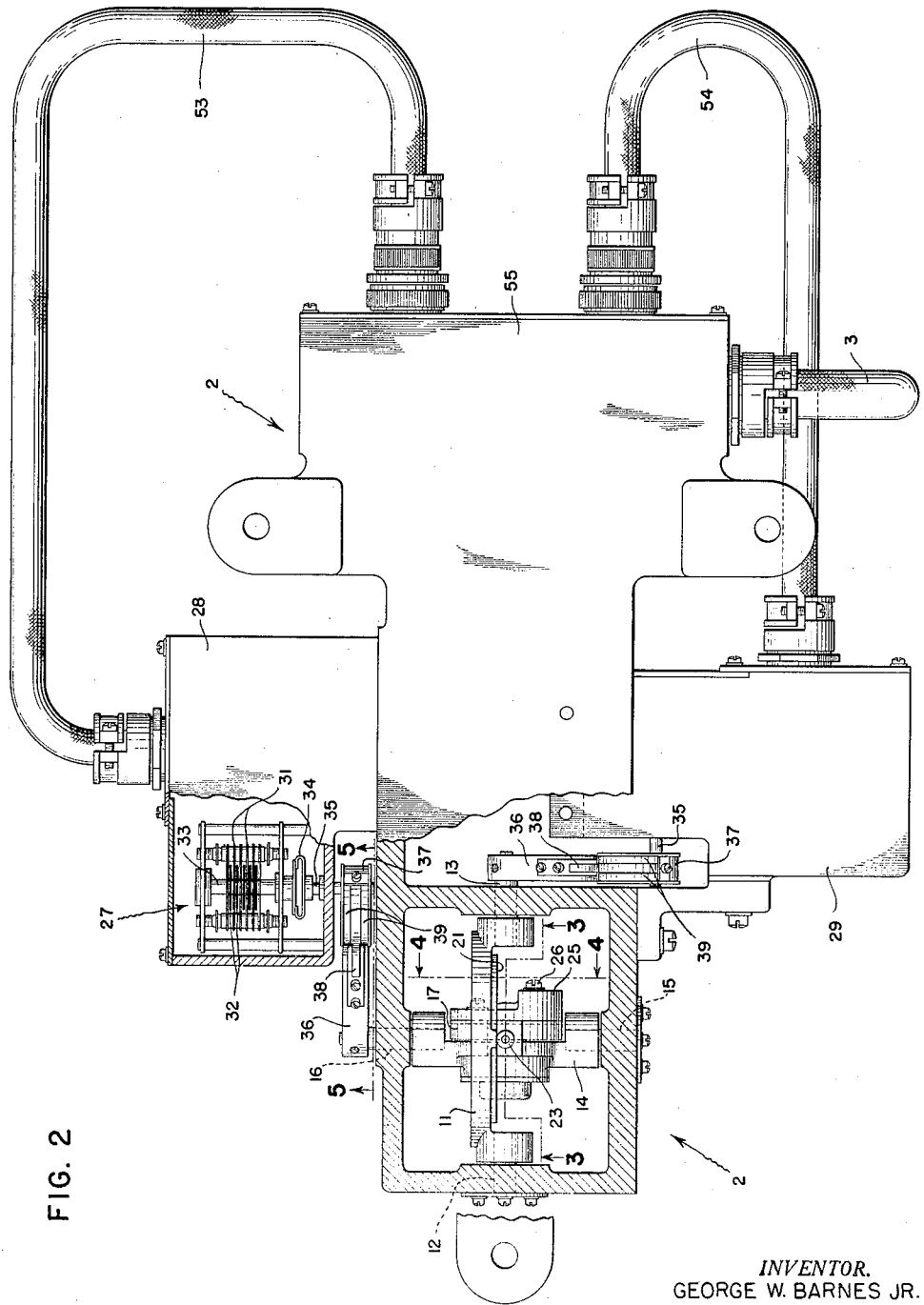
Figure 2 is a top view, partly in section, of the transmitter.

The movement of the gimbal rings as the writing implacement is moved is imparted to the transmitting portion of the electrical system as a whole. In this case movement of the writing implement in either direction is used to adjust the plates of one or the other of a pair of variable condensers an amount corresponding to the movement of the writing implement. As is shown in Figure 2, there is a condenser 27 that is adjusted as the small ring 14 of the gimbal arrangement is rotated. This condenser is housed in a suitable casing 28 that forms an integral part of the transmitting unit. A similar condenser is provided which is adjusted as the large ring 11 of the gimbal arrangement is rotated. This latter condenser is adjusted in a manner identical to that in which the condenser 27 is adjusted and is located in a housing 29. Each of the condensers consists of a series of stationary plates 31 and a series of movable plates 32 located between them. Each of the stationary plates is suitably mounted and insulated from the others. The movable plates are insulated from each other and attached to a rotatable shaft 33. This shaft is rotated by a shaft 35 through a flexible coupling 34. Movement is imparted to a rotatable shaft 33. This coupling comprises a quadrant 36 which is fastened to the shaft 16 and an eccentric 37 which is fastened to the shaft 35. It is noted that the arc of the outer surface of the quadrant is not concentric with shaft 16. Extending between the quadrant and the eccentric are three straps, the center one of which is given reference numeral 38 and the two outside ones of which are given reference numeral 39. The strap 38 is fastened to the upper portion of the segment by screws 41 and passes down the right, curved face thereof around the under side of the eccentric and is attached to the latter by screws 42. Straps 39 are attached to the eccentric by screws 44 and pass counter-clockwise around the same to the curved face of the quadrant and across the lower edge thereof. They are attached to the quadrant by suitable screws 45. It is noted that a spring 43 is provided to take up any slack which may occur in the strap 38. This type of drive connection does away entirely with lost motion between the gimbal and the condensers.

It is essential that the condensers each be so adjusted that when the writing implement 5 is in a line vertically below the center of the gimbal that the condensers be adjusted to their mid-position. To accomplish this the eccentric 37 is first attached to shaft 35 of the condenser as shown with the large radius of the eccentric horizontal and with shaft 35 adjusted so that the condenser is in its mid-position. The segment 36 is at this time loose in its shaft. A tool shown in outline at 49 is then placed over shaft 35 and projections on the tool are placed in openings 51 in the eccentric and 52 in the segment. This lines up the two parts so that segment 36 can then be tightened on its shaft 16 by set screws provided for that purpose. The straps 39 are then tightened by a screw 46 which extends through a plate 47. This plate is held in place by screws 45. It is noted that the segment is provided with a cutout portion 48 to receive the screw 46. When the parts are properly aligned and tightened the tool 49 is removed and not again used until the parts require readjustment.

The reason for having the part 37 eccentric in shape is to compensate for the non-linearity of movement of the arm 6 when it moves out of a vertical position. It will be seen that the arm is moved a greater distance across the paper for a given angular movement of either of the gimbal rings as the arm is moved away from the center and toward the edge of the writing table. Thus, for a given angular movement of the segment 36 when the writing implement is near a vertical position, the eccentric 37 will be moved a small amount, whereas for the same angular movement of the eccentric 36, if the writing implement is out of the vertical, the eccentric will be moved through a larger arc. Larger movements of the pen toward the edge of the writing table for a given angular movement of segment 36 produce larger angular movements of the eccentric 37 and condenser plates 32 as the pen gets nearer the edge of the writing table. Thus the angular movement of the condenser plates 32 corresponds exactly to the linear movement of the writing implement in any position of the latter on the writing tables.

The condensers that are located in housings 28 and 29 are connected by suitable cables 53 and 54 with another housing section 55 of the transmitter unit wherein suitable electrical connections are made with the cable 3 that extends to the receiving unit. The features of electrical circuit of which the condensers form an integral part are the subject matter of the above mentioned R. F. Wild case and will not be described in detail herein. It is sufficient to say that the cable 3 may be in any desired length so that the transmitter and receiver can be located at a distance from each other.

The gimbal rings have movement imparted to them by the arm 6 which is attached to the lower portion of supporting member 25. To this end that supporting member has a hole drilled in it and a slot extending from one side to the hole so that the pen arm may be placed in this hole and the sides of the slot pulled together by suitable clamping screws 61 to securely fasten the arm in place on the lower end of the support. It is noted that the writing implement 5 attached to the lower end of arm 6 may be either a pen or a pencil. It is shown herein as a pencil and will be described as such.

Figure 6:
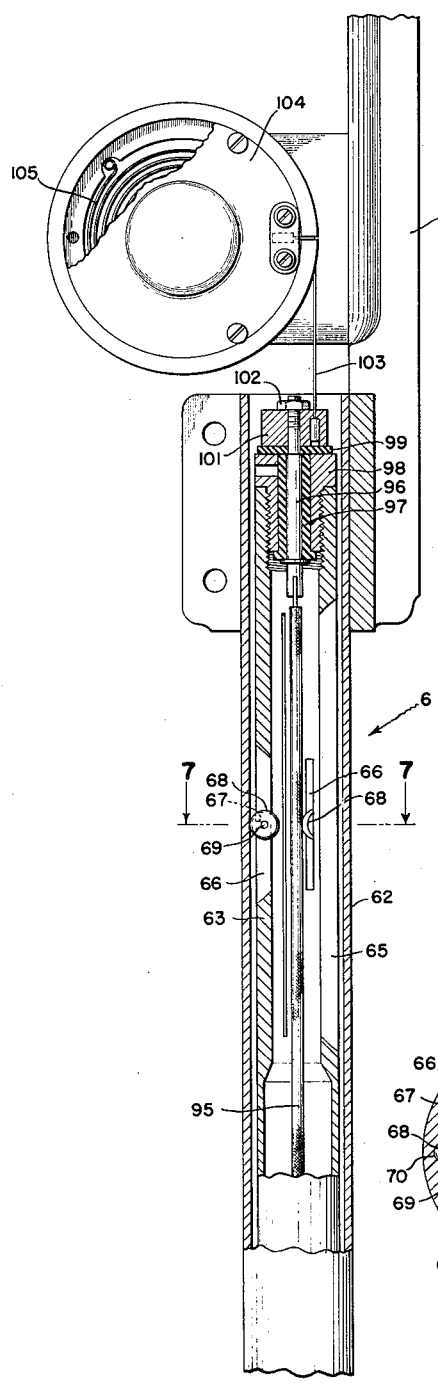
Figure 6 is an enlarged view, partly in section, of the upper end of the supporting arm for the writing implement.
Figure 8:
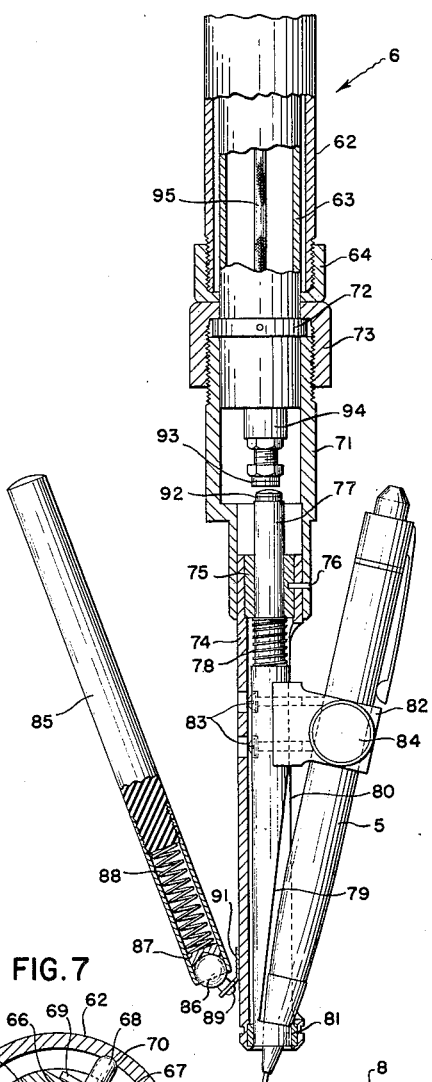
Figure 8 is an enlarged view, partly in section, of the lower end of the writing implement supporting arm and of the writing implement supporting mechanism.
Figure 7:
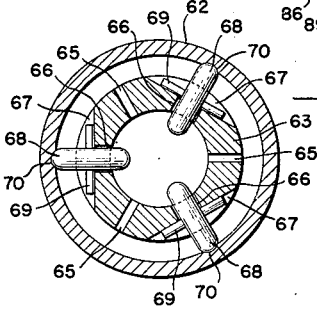
Figure 7 is a view taken on line 7—7 of Figure 6.

The arm 6 consists of a pair of tubes, the outer one of which is designated 62 and the inner one at which is designated 63. The inner tube is guided in the outer tube at its lower end by means of a ferrule 64 that is threaded on the lower end of the outer tube 62. The upper end of the tube 63 is guided for movement in the outer tube in a suitable manner that will now be described. The upper end of the tube 63 is made of a thicker cross section than the lower end as is best shown in Figure 6 and is provided with three long narrow slots 65 that are spaced 120° apart. Between each of these slots there is shown a short, wider slot 66. Each of the slots 66 has a horizontal groove 67 cut in it. These grooves serve to support the shafts 69 of rollers 68 that are placed in the grooves 66. Normally the outer surface of the rollers would have a diameter slightly larger than the inside diameter of the shaft 62. The slots 65, however, permit the tube 63 to be slightly compressed in diameter so that the rollers have a snug fit within the tube 62 and the shafts 69 are held within the slots 67. Thus when the tubes are moved axially with respect to each other, the lower end of the inner tube is guided by ferrule 64 and the upper end of the inner tube is guided by the rolling contact between the rollers 68 and the interior of tube 62. Preferably the tube 62 is formed with slight grooves 70 in which the rollers 68 move. This prevents the tubes 62 and 63 from rotating relative to each other.

Attached to the lower end of the inner tube is an assembly which supports the pencil 5. To this end a sleeve 71 is slipped over the lower end of the tube 63 up against a collar 72 that is suitably fastened to the tube. The sleeve is held in place by a second ferrule 73 that is threaded on the outer surface of the tube. This tube has inserted in its lower end a second tube 74 which in turn has inserted in it a bushing 75. The two tubes and the bushing are held in assembled relation by means of a pin 76 that extends through them. The lower end of tube 74 has one side cut away as shown at 80. Slidably mounted in the bushing 75 is a shaft 77 that is normally held in an extended position by means of a spring 78 which surrounds the shaft and bears with one end against the bushing and with the other end against a shoulder on this shaft. The lower end of the shaft is cut back as shown at 79 and is formed with an opening in its lower end through which the writing tip of the pencil 5 extends. The lower end of shaft 77 is guided for movement in the tube 74 by a second bushing 81. The pencil is held in position with its point extending through the opening in the lower end of the shaft by means of a bracket 82 that is attached to shaft 77 with suitable screws 83. The bracket has a thumb screw 84 in it so that it clamps the pencil and holds it in place. This pencil may be of any suitable type but is preferably a mechanical pencil of the push type so that the point may be readily renewed as it is used up.

A handle 85 is provided by means of which the arm 6 and pencil may be moved across the writing surface of the table 8. This handle is frictionally held by a ball and socket joint so that it will stay in the position in which it is placed. To this end the lower end of the handle is tubular in shape and is slightly reduced in diameter, so that a ball 86 may be received therein. This ball is forced against the reduced end of the handle by a cupped member 87 and a spring 88. The handle is attached to the lower end of tube 74 by a pin 89 that extends from the ball into a bracket 91 which is fastened to the tube. The handle 85 may be rotated so that it is accessible from the front or the side of the instrument by loosening ferrule 73 and rotating the tube 71 and the parts attached thereto. When handle 85 is extending in the proper direction, the ferrule is again tightened.

From the above description it will be seen that an operator of the instrument may grasp the handle 85 and hold it in a position most convenient to him in order to move the pencil and its supporting arm across the writing surface. It is noted that the parts are so formed that when the arm 6 is hanging free from its support on the gimbal mechanism, the tip of the pencil will be exactly below the center of the gimbal mechanism. It is necessary to have the arm 6 made extensible, since whenever the pencil is moved away from its vertical position, it will be further from the center of the gimbal arrangement than when at the center point. Thus as the pencil is moved across the writing surface, the supporting arm can elongate and contract as necessary in order to compensate for the increased and decreased distance between the writing tip and the center of the gimbal arrangement.

As has been mentioned above the receiving unit of the system is provided with a recording pen that works against the under side of the chart therein. Some means is, therefore, necessary in that unit to maintain the pen in engagement with the chart. This is accomplished in a manner fully set forth in the above mentioned Barnes et al. application. Since it is desirable that the pen in the receiver does not engage the chart therein except when the pencil tip of the transmitter is in engagement with the writing table 8, a means is provided between the two instruments which will keep the pen of the receiver out of engagement with the chart in that unit except at such times when the point of pencil 5 is in engagement with the writing table 8 of the transmitter. This is accomplished electrically in a manner not of interest in this application. It is sufficient to note that an electrical circuit is closed each time the pencil of the transmitter is moved into engagement with the writing surface. This is the reason for having the pencil holding shaft 77 slidably in the sleeve 74. Normally the shaft 77 is held in extended position by means of spring 78 but when the pencil is moved into engagement with the writing surface, the force of this spring is overcome to move a contact 92 on the upper end of the shaft 77 into engagement with a second contact 93 that is located within the tube 71 and insulated from that tube by an insulating member 94. Extending upwardly through the inner tube 63 from the contact 93 is a wire 95 whose upper end is fastened to an elongated rod 96. This rod is insulated from the rest of the structure by a tube 97 that is received in a member 98 which in turn is threaded into the upper end of the tube 63. The upper end of the rod 96 has placed over it an insulating disc 99 and a block 101. This assembly is held in place in the sleeve 98 by a nut 102 on the upper end of the rod 96.

Since the weight of the inner tube 63 and the pencil supporting assembly on the lower end thereof is liable to be sufficiently large to make it difficult for the person operating the instrument to use, a counterbalancing spring is used to offset this weight and to help retract the inner tube 63 when it is to be moved up into the outer tube 62. To this end there is provided a cable 103 that is suitably attached to the block 101, which cable extends to a spring reel 104 that is maintained under tension by a spring 105. The force exerted by this spring may be adjusted so that more or less of the arm 6 is counter-balanced thereby. The cable 103 serves the dual purpose of pulling the tube 63 to a retracted position and also carrying the current for the circuit of which the contact 93 and wire 95 form a part. For this purpose the spring reel is insulated from the supporting arm 25. A wire may extend in any suitable manner from the insulated spring reel 104 through the various cables from the transmitter to the receiver. The other portion of the circuit which is closed when contact 92 engages contact 93 is formed by the instrument itself since the contact 92 is grounded to the pencil supporting arm.

From the above it will be seen that the transmitting instrument described herein consists of a pencil which is mounted on an extensible arm that is in turn movably supported by a gimbal arrangement. Thus the pencil can be moved in any direction from a vertical position to any point on the writing surface of the table or support 8. Any movement, no matter how slight, of the writing tip along this table is transmitted without lost motion by the gimbal to one or both of a pair of condensers that form the transmitting units of an electrical capacitance type of circuit.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is:

1. In a recording system, a transmitting station, a flat writing surface at said transmitting station, a writing implement to be moved to all points on said writing surface, means to suspend said implement vertically over the center point of said writing surface for movement around a point out of the plane of said writing surface including means moved as said implement is moved, electrical transmitting means and connecting means between said means moved as said implement is moved and said electrical transmitting means to operate the latter linearly for a non-linear movement of the former.

2. In a writing system, a transmitting station including a flat writing surface, a writing implement to be moved to any part of said surface, means to support said implement vertically over the center point of said surface for movement around a point out of the plane of said surface, electrical transmitting means, and means to operate said transmitting means by said supporting means operative to provide linear movement of said transmitting means as said implement is moved from one edge to the opposite edge of said writing surface.

3. In a writing system, a transmitting station comprising a flat writing surface, a writing implement to be moved to any place on said surface, means to support said implement vertically above the center point on said surface, electrical transmitting apparatus, and means to operate said apparatus by said supporting means including a segment member moved by said supporting means, an eccentric member connected to said apparatus, and strap means to transfer movement of said segment member to said eccentric member.

4. In a telautographic system, a transmitting station including a flat writing surface, a writing implement to be moved to any point on said surface, means to support said implement for movement over said surface from a point vertically over the center thereof, said supporting means including a first part rotatable as said implement moves back and forth across said surface in one direction, and a second part rotatable as said implement moves back and forth across said surface in a direction at right angles to said first direction, a pair of electrical transmitting members, and a means to connect said transmitting members to said parts respectively including means to adjust said transmitting members linearly as the part attached thereto is rotated due to movement of said implement from the center of said writing surface to an edge thereof.

5. In a recording system, a writing surface, a writing implement to be moved over said surface, an arm suspended vertically above said surface, a holder attached to and extending below said arm, a member slidably received in said holder and having an opening in the lower end thereof, means to fasten detachably said implement in said member with the writing tip thereof extending through said opening and coaxial with said arm, means to maintain normally said member in an extended position with a biasing force, and a handle attached to said holder by means of which said arm may be moved to bring said implement into engagement with said writing surface, said engagement forcing said member against its bias in said holder.

6. In a recording system, a writing implement, means to hold said implement in position for writing therewith comprising an arm, a holder having an opening in the lower end thereof attached to said arm, a member slidably received in said opening, means to attach said implement to said member with the writing tip of said implement extending through the opening in said holder, means to bias normally said member toward said opening, a handle attached to said holder by means of which said arm may be moved, and contacts forming part of an electric circuit carried respectively by said holder and said member, said contacts being opened when said member is moved under its biasing means and closed when said implement is moved to writing position.

7. In a recording system, a writing surface, a writing implement to be moved over said surface, and means to support said implement above said surface for movement thereover including an arm, a member projecting from said arm and having an opening in the end thereof to receive the writing tip of said implement, means to hold said implement in said member at an angle thereto with the tip of said implement coaxial with said arm, and a part mounted on said member for universal movement relative thereto whereby said arm and implement may be moved across said surface.

8. In a recording system, a writing implement, means to mount said implement for movement over a writing surface, a part rotated as said implement is moved, an electrical transmitting apparatus, means to drive said apparatus by said part comprising a segment shaped member, a cam member attached to said apparatus, straps attached at one end to said segment and at their other end to said cam member to transfer movement of the former to the latter, and means to adjust some of said straps to vary the initial relation between said eccentric and said cam member.

9. In a recording system, a writing surface, a writing implement to be moved over said writing surface, and means to support said implement comprising a telescoping arm including a plurality of tubular parts, cooperating means on said parts to maintain the said parts concentric to each other, means to attach said writing implement to one of said parts in such a manner that the writing tip thereof is concentric with said part, means to mount the other of said parts for universal movement whereby said writing implement may be moved to any point over said writing surface, and means to act normally to counterbalance said writing implement and the said part upon which it is mounted.

10. In a recording system, a writing surface, a writing implement to be moved over said surface, a pivotal support, a telescoping arm comprising a plurality of parts and having one part attached to said support, means to attach said writing implement to another part of said arm with the writing tip of said implement coaxial with said arm, resilient means to maintain normally the parts of said arm in telescoped relation, and means to adjust said resilient means so that it exerts a force sufficient to substantially counterbalance the weight of said implement and the part of said arm attached thereto.

11. In a recording system, a writing surface, a writing implement to be moved in any direction across said surface, means to mount said implement for said movement including a support mounted vertically over said writing surface, a first ring pivoted to said support for movement around an axis, a disc pivoted coaxially of said ring and at right angles to said first mentioned axis, connecting means between said disc and said implement, a second ring surrounding said first ring, means to pivot said second ring to said support on an axis at right angles to said first mentioned axis and concentric with the axis of said disc, and means carried by said disc to move said second ring as said disc is moved around its own axis.

12. In a writing system, a writing implement, means to mount said implement for universal movement including a support, a first ring, means to pivot said first ring to said support for movement around a horizontal axis, a second ring received by said first ring, means to pivot said second ring in said support for movement around a second horizontal axis at right angles to said first axis, a disc carried by said second ring and pivotally mounted coaxial thereof, means carried by said disc and engaging said first ring at spaced points, and means to attach said implement to said disc.

13. In a recording system, a transmitting station having a flat writing surface, a writing implement, means to mount said writing implement for movement around a point above the center of the writing surface with which it cooperates whereby different angular movements of said mounting means are necessary to move said writing implement the same distance along its writing surface as it moves outwardly from the center thereof, electrical transmitting means operative to energize said electrical drive means, and connecting means between said means to mount and said electrical transmitting means to move the latter equal increments for equal increments of linear movement of said writing implement.

14. In a recording system, a transmitting station having a flat writing surface, a writing implement, means including a gimbal arrangement to support said writing implement for movement in any direction about a point above the center of said writing surface whereby equal linear movements of said writing implement along said writing surface will produce unequal angular movements of said gimbal arrangement as said writing implement is moved different distances from the center of said writing surface, a first transmitting device to be moved as said writing implement is moved in one direction, a second transmitting device to be moved as said writing implement is moved in a direction at an angle to said first direction, and drive means between said gimbal arrangement and said transmitting devices to impart equal movements to said transmitting devices as said writing implement is moved equal distances across said writing surface.

GEORGE W. BARNES, Jr.
JOHN F. GOETZ.
WALTER P. WILLS.

REFERENCES CITED

The following references are of record in the file of this patent:

UNITED STATES PATENTS

| Number | Name | Date |
| --- | --- | --- |
| 957,050 | Golden | May 3, 1910 |
| 1,746,331 | Aftergut et al. | Feb. 11, 1930 |
| 1,875,833 | Van Nostrand | Sept 6, 1932 |
| 2,062,110 | Swartwout | Nov. 24, 1936 |
| 2,168,047 | Skellett | Aug. 1, 1939 |
| 2,179,663 | Link, Jr. | Nov. 14, 1939 |
| 2,192,319 | Matheson | Mar. 5, 1940 |
| 2,274,638 | Rosene | Mar. 3, 1942 |
| 2,446,392 | Rey | Aug. 3, 1948 |

FOREIGN PATENTS

| Number | Country | Date |
| --- | --- | --- |
| 216,013 | Germany | Nov. 2, 1909 |
| 277,863 | Germany | Sept. 10, 1914 |